US010257156B2

United States Patent
Torzillo et al.

(10) Patent No.: US 10,257,156 B2
(45) Date of Patent: Apr. 9, 2019

(54) OVERPROVISIONING FLOATING IP ADDRESSES TO PROVIDE STATEFUL ECMP FOR TRAFFIC GROUPS

(71) Applicant: F5 Networks, Inc., Seattle, WA (US)

(72) Inventors: Antonio Torzillo, Edmonds, WA (US); James Arthur Thomson, Glen Mills, PA (US); Paul I. Szabo, Shoreline, WA (US); William Ross Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 81 days.

(21) Appl. No.: 14/702,090

(22) Filed: May 1, 2015

(65) Prior Publication Data
US 2016/0191457 A1 Jun. 30, 2016

Related U.S. Application Data

(60) Provisional application No. 62/099,043, filed on Dec. 31, 2014.

(51) Int. Cl.
*G06F 15/173* (2006.01)
*H04L 29/12* (2006.01)
(Continued)

(52) U.S. Cl.
CPC ........ *H04L 61/2007* (2013.01); *H04L 41/042* (2013.01); *H04L 41/0654* (2013.01);
(Continued)

(58) Field of Classification Search
CPC . H04L 67/1034; H04L 69/40; H04L 67/1023; H04L 41/042; H04L 41/0654
See application file for complete search history.

(56) References Cited

U.S. PATENT DOCUMENTS 6,988,148 B1 1/2006 Sheth
8,108,554 B1 * 1/2012 Masters .............. H04L 41/0659
709/218
(Continued)

OTHER PUBLICATIONS

F5 Networks Inc., BIG-IP Advanced Routing Core Configuration Guide Version 7.5.1, https://support.f5.com/content/kb/en-us/products/big-ip_ltm/manuals/related/core-configuration-7-5-1/_jcr_content/pdfAttach/download/file.res/core-configuration-7-5-1.pdf, published on Jun. 25, 2013, 86 pages.
(Continued)

*Primary Examiner* — Padma Mundur
(74) *Attorney, Agent, or Firm* — John W. Branch; Lowe Graham Jones PLLC

(57) ABSTRACT

Embodiments are directed towards overprovisioning IP addresses among a plurality of traffic management devices (TMDs). A plurality of IP addresses may be distributed among a plurality of available TMDs. A corresponding mirror TMD may be determined for each IP address. The corresponding mirror TMD for an IP address may be different than the available TMD currently associated with the IP address. In various embodiments, connections associated with each IP address may be mirrored at their corresponding mirror TMDs. The available TMDs may be employed to perform traffic management tasks on received packets based on at least a destination IP address of the received packets and the IP addresses associated with the available TMDs. If a TMD becomes unavailable, the IP addresses associated with the unavailable TMD may be redistributed to at least one remaining available TMD.

40 Claims, 11 Drawing Sheets

(51) Int. Cl.
*H04L 12/741* (2013.01)
*H04L 12/24* (2006.01)
*H04L 29/08* (2006.01)
*H04L 29/14* (2006.01)

(52) U.S. Cl.
CPC .......... *H04L 45/74* (2013.01); *H04L 67/1023* (2013.01); *H04L 67/1034* (2013.01); *H04L 69/40* (2013.01)

(56) References Cited

U.S. PATENT DOCUMENTS

| | | | |
|---|---|---|---|
| 8,533,308 B1 | 9/2013 | Rothstein | |
| 8,566,452 B1 | 10/2013 | Goodwin, III et al. | |
| 2003/0018927 A1* | 1/2003 | Gadir | G06F 11/2005 714/4.11 |
| 2005/0076123 A1* | 4/2005 | Hamadi | G06F 9/5061 709/226 |
| 2006/0291388 A1 | 12/2006 | Amdahl et al. | |
| 2008/0104273 A1* | 5/2008 | Bruck | H04L 29/12216 709/238 |
| 2010/0042869 A1* | 2/2010 | Szabo | G06F 8/67 714/4.1 |
| 2010/0223364 A1 | 9/2010 | Wei | |
| 2013/0128729 A1 | 5/2013 | Nair et al. | |
| 2013/0159487 A1* | 6/2013 | Patel | H04L 67/1031 709/223 |
| 2015/0117203 A1* | 4/2015 | Filsfils | H04L 47/122 370/235 |

OTHER PUBLICATIONS

F5 Networks, Inc., BIG-IP TMOS: IP Routing Administration Version 11.3, https://support.f5.com/content/kb/en-us/products/big-ip_ltm/manuals/product/tmos-ip-routing-administration-11-3-0/_jcr_content/pdfAttach/download/file.res/BIG-IP_TMOS__IP_Routing_Administration.pdf, published on Nov. 15, 2012, 60pages.

International Search Report and Written Opinion for International Application No. PCT/US2015/028865 dated Sep. 25, 2015.

European Search Report and Written Opinion for International Application No. PCT/US2015/028865 dated Jul. 3, 2018, 10 pages.

Yokota et al., "A Proposal of DNS-Based Adaptive Load Balancing Method for Mirror Server Systems and Its Implementaion," Proceedings of the 18th International Conference on Advanced Information Networking and Application, Mar. 29-31, 2004, Japan, pp. 208-213.

* cited by examiner

OVERPROVISIONING FLOATING IP ADDRESSES TO PROVIDE STATEFUL ECMP FOR TRAFFIC GROUPS

RELATED APPLICATIONS

This application is a Utility Patent application based on a previously filed U.S. Provisional Patent Application, U.S. Ser. No. 62/099,043 filed on Dec. 31, 2014, the benefit of the filing date of which is hereby claimed under 35 U.S.C. § 119(e), and which is further incorporated by reference in its entirety.

TECHNICAL FIELD

The present patent application relates generally to packet traffic management and more particular, but not exclusive, to overprovisioning IP addresses among a plurality of traffic management devices.

BACKGROUND

High performance/high availability client-server computing systems often employ multiple application server computers. Multiple server computers are used to provide services or applications to many client computers/devices. Network traffic management devices (e.g., load balancers) may be used to distribute client requests to one or more of the servers. Network traffic management devices (TMDs) may be arranged so the identity and/or quantity of servers available to process requests may be transparent and unknown to the client devices. Accordingly, TMDs may establish connections between clients and servers. A TMD may maintain state information that enables requests and responses to be efficiently forwarded between clients and servers. In some cases, a TMD may be fail due to a variety of reasons. Rather than reestablish all connections that it is maintaining, a failover TMD may be employed. However, direct mirroring of a TMD on another TMD can be resource intensive with reduced scalability. Also, TMDs may be added for capacity reasons. So, state changes can occur as a result of adding or removing TMDs. Thus, it is with respect to these considerations and others that the embodiments described herein have been made.

BRIEF DESCRIPTION OF THE DRAWINGS

Non-limiting and non-exhaustive embodiments are described with reference to the following drawings. In the drawings, like reference numerals refer to like components throughout the various figures unless otherwise specified.

For a better understanding of the embodiments described herein, reference will be made to the following Detailed Description, which is to be read in association with the accompanying drawings, wherein.

DETAILED DESCRIPTION

Figure 1:
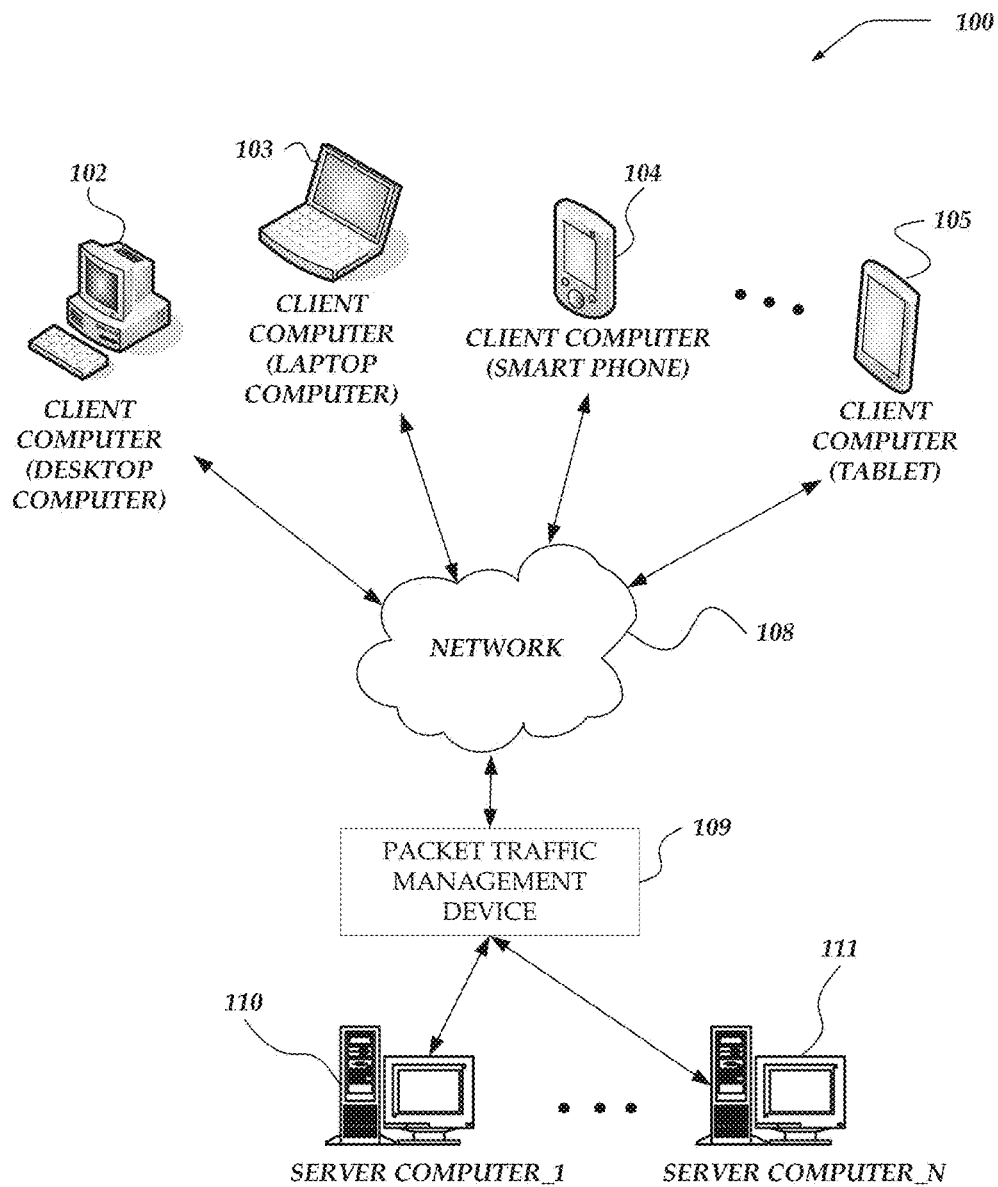
FIG. 1 is a system diagram of an environment in which embodiments may be implemented.

Various embodiments are described more fully hereinafter with reference to the accompanying drawings, which form a part hereof, and which show, by way of illustration, specific embodiments. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "traffic management device" (TMD) refers to a computing device that manages and/or monitors network traffic. TMDs may be physical devices and/or virtual machines. In various embodiments, a TMD may manage connections and/or packets between endpoints. TMDs may be configured to perform one or more tasks. Tasks can be performed by the TMD itself, or the TMD may deploy one or more component virtual machines to perform one or more tasks. Examples of tasks include, but are not limited to, load balancing, server monitoring, session monitoring, log and/or event monitoring, object data management, routing, translating, switching packets, intrusion detection/prevention, denial of service protection, encryption/decryption, compression/decompression, or the like, or any combination thereof. Devices that may act as TMDs include, for example, routers, proxies, firewalls, load balancers, cache devices, devices that perform network address translation, or the like, or any combination thereof.

In various embodiments, TMDs may be available or unavailable. An available TMD may be a TMD that is up and running and can perform its designated tasks. An unavailable TMD may be a TMD that is unable to perform its designated tasks. A TMD may become unavailable for a variety of reasons, such as, but not limited to, the TMD crashing or losing power, the TMD losing communication, the TMD halting its designated task to perform other operations (e.g., upgrades or backups), or the like. Similarly, a TMD can become available for a variety of reasons, such as, but not limited to, being added to a group of TMDs (e.g., to increase traffic capacity), a TMD being restarted or powered up, or the like. Embodiments may be generally described as TMDs being added or removed (i.e., becoming available or unavailable) for a variety of reasons.

As used herein, the term "disaggregator" (DAG) refers to a computing device that routes incoming connections to one of a plurality of computing devices, such as one or more TMDs. In one embodiment, a DAG can route incoming connections to particular computing devices based on a hash algorithm and one or more attributes associated with the incoming connection. Attributes may include, but are not limited to, a source port, a destination port, an IP address, other connection fields associated with a connection, or the like. The source port and destination port as referenced herein refer to a TCP source port number and TCP destination port number, respectively. For example, the DAG may create a hash value by hashing a source (remote) IP address and a destination (local) IP address of the incoming connection. The DAG may then route the incoming connection to a particular computing device based on a pre-determined mapping of hash values to TMDs based on the IP addresses associated with the TMDs.

In various embodiments, one or more TMDs and one or more DAGs may be a system collectively referred to as a packet traffic management device. In various embodiments, TMDs and/or DAGs may be employed one or more separate computing devices. In some embodiments, a plurality of TMDs may be referred to as a device service cluster.

As used herein, the term "rounding error" refers to a scenario where IP addresses are not evenly distributed among TMDs, but rather at least one TMD has more IP addresses than at least one other TMD. Depending on the number of available TMDs and the number of IP addresses, there may either be a rounding error or there may be no rounding error (e.g., equal number of IP addresses are associated with each TMD). In some embodiments, the rounding error may be based on the number of IP addresses of a first TMD compared to the number of IP address of a second TMD, where the first TMD has more IP addresses than the second TMD. In other embodiments, the rounding error may be based on the number TMDs that have a greater number of IP addresses compared to the total number of TMDs. However, embodiments are not so limited and other methods and/or mechanisms may be employed to calculate the rounding error.

In some embodiments described herein, the number of IP addresses may be selected such that a rounding error is within a predetermined threshold. The rounding error may be determined for a predetermined number of available TMDs or may be averaged over multiple numbers of available TMDs. For example, assume there are a maximum of four available TMDs. For any given number of IP addresses the rounding error may be separately determined for four available TMDs, three available TMDs, or two available TMDs. In some embodiments, these rounding errors may be averaged, and the average may be compared to the predetermined threshold. In another embodiment, the maximum rounding error may be compared to the predetermined threshold. In yet another embodiment, the rounding error for a particular number of available TMDs may be compared to the predetermined threshold. Any of these mechanism, and others, may be employed to determine if the rounding error is below the predetermined threshold for the given number of IP addresses used.

The following is a brief description of embodiments described herein. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards over-provisioning IP addresses among a plurality of traffic management devices (TMDs). A plurality of IP addresses may be distributed among available TMDs from a plurality of TMDs. The number of IP addresses may be greater than the number of TMDs in the plurality of TMDs. In some embodiments, the number of IP addresses may be based on the least common multiple from 1 to the number of TMDs in the plurality of TMDs. In other embodiments, the number of IP addresses may be determined based on a rounding error within a predetermined threshold.

In some embodiments, a corresponding mirror TMD may be determined for each IP address. The corresponding mirror TMD for an IP address may be different than the available TMD currently associated with the IP address. In various embodiments, connections associated with each IP address may be mirrored at their corresponding mirror TMDs. In other embodiments, each IP address may have a corresponding media access control address that is assigned to an available TMD and reassign to a different TMD if the TMD becomes unavailable.

The available TMDs may be employed to perform traffic management tasks on received packets based on at least a destination IP address of the received packets and the IP addresses associated with the available TMDs. In some embodiments, if a TMD is associated with more IP addresses than another TMD, then connections associated with the TMD may be load balanced among the available TMDs.

If a TMD becomes unavailable, the IP addresses associated with the unavailable TMD may be redistributed to at least one remaining available TMD. Similarly, if a TMD becomes available that was previously unavailable, at least one IP address associated with the previously available TMDs may be redistributed to the newly available TMD.

In some other embodiments, frames of data may be distributed to a plurality of IP addresses based on ECMP. Additionally, a plurality of IP addresses may be employed for next hop routes based on ECMP. Also, the plurality of IP addresses may be employed as a next hop IP address that is communicated to each TMD.

Although embodiments are primarily described herein as distributing IP addresses, embodiments are not so limited. Rather, in various embodiments, tunnels may be employed (instead of IP address), such that a plurality of tunnels are associated with the plurality of TMDs and redistributed based on a TMD becoming unavailable. For example, a DAG could use tunnels instead of IPs to direct traffic to individual TMDs, as described herein.

Illustrative Operating Environment

FIG. 1 shows components of one embodiment of an environment in which various embodiments may be practiced. Not all of the components may be required to practice the various embodiments, and variations in the arrangement and type of the components may be made.

As shown, system 100 of FIG. 1 may include client computers 102-105, server computers 110-111, network 108, and Packet Traffic Management Device (PTMD) 109. Client computers 102-105 may communicate with server computers 110-111 via network 108 and PTMD 109.

Network 108 may be configured to couple network computers with other computing devices, including client computers 102-105, server computers 110-111, PTMD 109, other network devices, other networks, or the like. In various embodiments, information communicated between devices may include various kinds of information, including, but not limited to, processor-readable instructions, client requests, server responses, program modules, applications, raw data, control data, video data, voice data, image data, text data, or the like. In some embodiments, this information may be communicated between devices using one or more technologies and/or network protocols.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another. For example, network 108 can include—in addition to the Internet—LANs, WANs, Personal Area Networks (PANs), Campus Area Networks (CANs), Metropolitan Area Networks (MANs), direct communication connections (such as through a USB port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least network computers 103-105. Such sub-networks may include mesh networks, Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between client computers 102-105, PTMD 109, server computers 110-111, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

At least one embodiment of client computers 102-105 may be an embodiment of network computer 200 of FIG. 2 described in more detail below. Briefly, in some embodiments, client computers 102-105 may be configured to communicate with server computers 110-111 via PTMD 109.

In some embodiments, at least some of client computers 102-105 may operate over a wired and/or wireless network to communicate with other computing devices or PTMD 109. Generally, client computers 102-105 may include computing devices capable of communicating over a network to send and/or receive information, perform various online and/or offline activities, or the like. It should be recognized that embodiments described herein are not constrained by the number or type of remote computers employed, and more or fewer remote computers—and/or types of remote computers—than what is illustrated in FIG. 1 may be employed.

Devices that may operate as client computers 102-105 may include various computing devices that typically connect to a network or other computing device using a wired and/or wireless communications medium. Client computers 103-105 may be mobile devices and may include portable computers, and client computer 102 may include non-portable computers. Examples of client computer 102 may include, but is not limited to, desktop computers, personal computers, multiprocessor systems, microprocessor-based or programmable electronic devices, network PCs, or the like, or integrated devices combining functionality of one or more of the preceding devices. Examples of client computers 103-105 may include, but are not limited to, laptop computers (e.g., client computer 103), smart phones (e.g., client computer 104), tablet computers (e.g., client computer 105), cellular telephones, display pagers, Personal Digital Assistants (PDAs), handheld computers, wearable computing devices, or the like, or integrated devices combining functionality of one or more of the preceding devices. As such, client computers 102-105 may include computers with a wide range of capabilities and features.

Client computers 102-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, client computers 102-105 may be enabled to connect to a network through a browser, or other web-based application.

Client computers 102-105 may further be configured to provide information that identifies the client computer. Such identifying information may include, but is not limited to, a type, capability, configuration, name, or the like, of the remote computer. In at least one embodiment, a remote computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of PTMD 109 may be an embodiment of network computer 200 of FIG. 2 described in more detail below. Briefly, however, PTMD 109 may include one or more network computers capable of managing network traffic between client computers 102-105 and server computers 110-111. Such computers include, for example, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, capacity of a server, content requested, or a host of other traffic distribution mechanisms.

PTMD 109 may include one or more DAGs, and one or more separate TMDs. Each DAG may provide high-level management/coordination of the connection through each TMD. In at least one embodiment, the DAG or other controller may control which IP addresses are associated with each TMD. In the event of a TMD failure or a TMD otherwise becoming unavailable, the IP addresses of the unavailable TMD may be redistributed to any remaining available TMDs. Similarly, if a TMD becomes available, the IP addresses may be redistributed among the available TMDs including the newly available TMD. It should be noted that DAGs may be in a same physical box as TMDs, and may be executing on same or different hardware (CPU, NPU, Switch, FPGA, etc.) within the same box. Also, DAGs and TMDs may be implemented in separate hardware and/or boxes.

At least one embodiment of server computers 110-111 may be an embodiment of network computer 200 of FIG. 2 described in more detail below. Server computers 110-111 may include virtually any network computer or network device that may operate as a website server. However, server computers 110-111 are not limited to website servers, and may also operate as messaging server, a File Transfer Protocol (FTP) server, a database server, content server, or the like. Additionally, each of server computers 110-111 may be configured to perform a different operation. Devices that may operate as server computers 110-111 include various network devices, including, but not limited to personal computers, desktop computers, multiprocessor systems, microprocessor-based or programmable consumer electronics, network PCs, server devices, network appliances, and the like. Server computers 110-111 may include many of the same components illustrated in FIG. 2.

Although FIG. 1 illustrates server computers 110-111 as single computing devices, embodiments are not so limited. For example, one or more functions of each of server computers 110-111 may be distributed across one or more distinct network computers. Moreover, server computers 110-111 are not limited to a particular configuration. Thus, in one embodiment, server computers 110-111 may contain a plurality of network computers that operate using a master/slave approach, where one of the plurality of network computers of server computers 110-111 operate to manage and/or otherwise coordinate operations of the other network computers. In other embodiments, the server computers 110-111 may operate as a plurality of network computers within a cluster architecture, a peer-to-peer architecture, and/or even within a cloud architecture. Thus, embodiments are not to be construed as being limited to a single environment, and other configurations, and architectures are also envisaged.

Illustrative Network Computer

Figure 2:
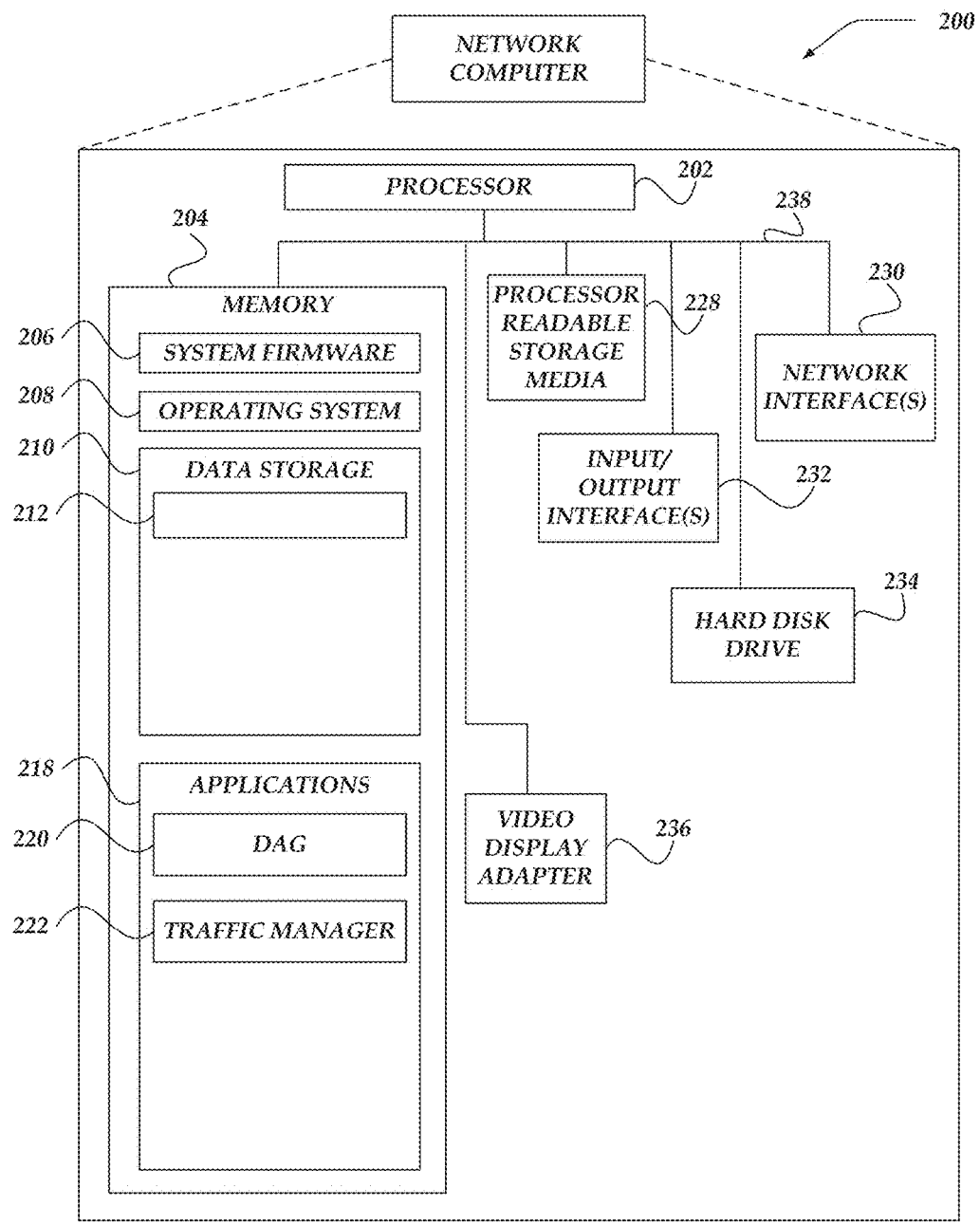
FIG. 2 shows an embodiment of a network computer that may be included in a system such as that shown in FIG. 1.

FIG. 2 shows one embodiment of a network computer 200 that may include many more or less components than those shown, which may vary dependent on the functionality or embodiment of the network computer. The components shown, however, are sufficient to disclose an illustrative embodiment. Network computer 200 may represent, for example client computers 102-105 of FIG. 1, server computers 110-111, PTMD 109, and/or other network computers.

Network computer 200 may be configured to operate as a server, client, peer, a host, or other computing device. In general, network computer 200 may be a desktop computer, mobile computer (e.g., laptop computers, smart phones, tablets, or the like), server computer, or any other network computer that can communicate through a network to access and/or store data.

Network computer 200 includes processor 202, processor readable storage media 228, network interface unit 230, an input/output interface 232, hard disk drive 234, video display adapter 236, and memory 204, all in communication with each other via bus 238. In some embodiments, processor 202 may include one or more central processing units.

Network interface 230 may include circuitry for coupling network computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, W-CDMA, LTE, UMTS, OFDM, CDMA2000, EV-DO, HSDPA, or any of a variety of other wireless communication protocols. Network interface 230 is sometimes known as a transceiver, transceiving device, or network interface card (NIC). In various embodiments, network interface 230 may enable network computer 200 to access the internet and/or otherwise communicate with other network computers.

Network computer 200 also comprises input/output interface 232 for communicating with external devices, such as a keyboard or other input or output devices not shown in FIG. 2. Input/output interface 232 can utilize one or more communication technologies, such as USB, infrared, Bluetooth™, or the like.

Memory 204 generally includes RAM, ROM and one or more permanent mass storage devices, such as hard disk drive 234, tape drive, optical drive, and/or floppy disk drive. Memory 204 stores operating system 208 for controlling the operation of network computer 200. Any general-purpose operating system may be employed. System firmware 206 is also provided for controlling the low-level operation of network computer 200 (e.g., BIOS).

Although illustrated separately, memory 204 may include processor readable storage media 228. Processor readable storage media 228 may be referred to and/or include computer readable media, computer readable storage media, and/or processor readable storage device. Processor readable storage media 228 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 204 further includes one or more data storage 210, which can be utilized by network computer 200 to store, among other things, applications 218 and/or other data. For example, data storage 210 may also be employed to store information that describes various capabilities of network computer 200. The information may then be provided to another device based on any of a variety of events, including being sent as part of a header during a communication, sent upon request, or the like.

Data storage 210 may also include a database, text, spreadsheet, folder, file, or the like, that may be configured to maintain and store user account identifiers, user profiles, email addresses, IM addresses, and/or other network addresses; or the like. Data storage 210 may further include program code, data, algorithms, and the like, for use by a processor, such as processor 202 to execute and perform actions. In one embodiment, at least some of data store 210 might also be stored on another component of network computer 200, including, but not limited to processor-readable storage media 228, hard disk drive 234, or the like.

Applications 218 may include computer executable instructions, which may be loaded into mass memory and run on operating system 208. Examples of application programs may include calendars, search programs, email client applications, IM applications, SMS applications, contact managers, task managers, transcoders, schedulers, database programs, word processing programs, encryption applications, security applications, spreadsheet applications, games, and so forth.

In some embodiments, applications 218 may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Applications 218 may also include view DAG 220 and/or traffic manager 222. Each of these application may be executing on same or different or separate network devices (including virtual and physical network devices). DAG 220 may provide high-level traffic management for a plurality of traffic managers 222. In various embodiments, DAG 220 and/or traffic managers 222 may be employed in software, hardware, or a combination thereof. In some embodiments, network computer 200 may be enabled to employ various embodiments, combinations of embodiments, processes, or parts of processes, as described herein. So, in various embodiments, network computer 200 may perform at least a portion of the operations described herein to overprovision and/or redistribute IP addresses among a plurality of traffic management devices.

General System Overview

Figure 3A:
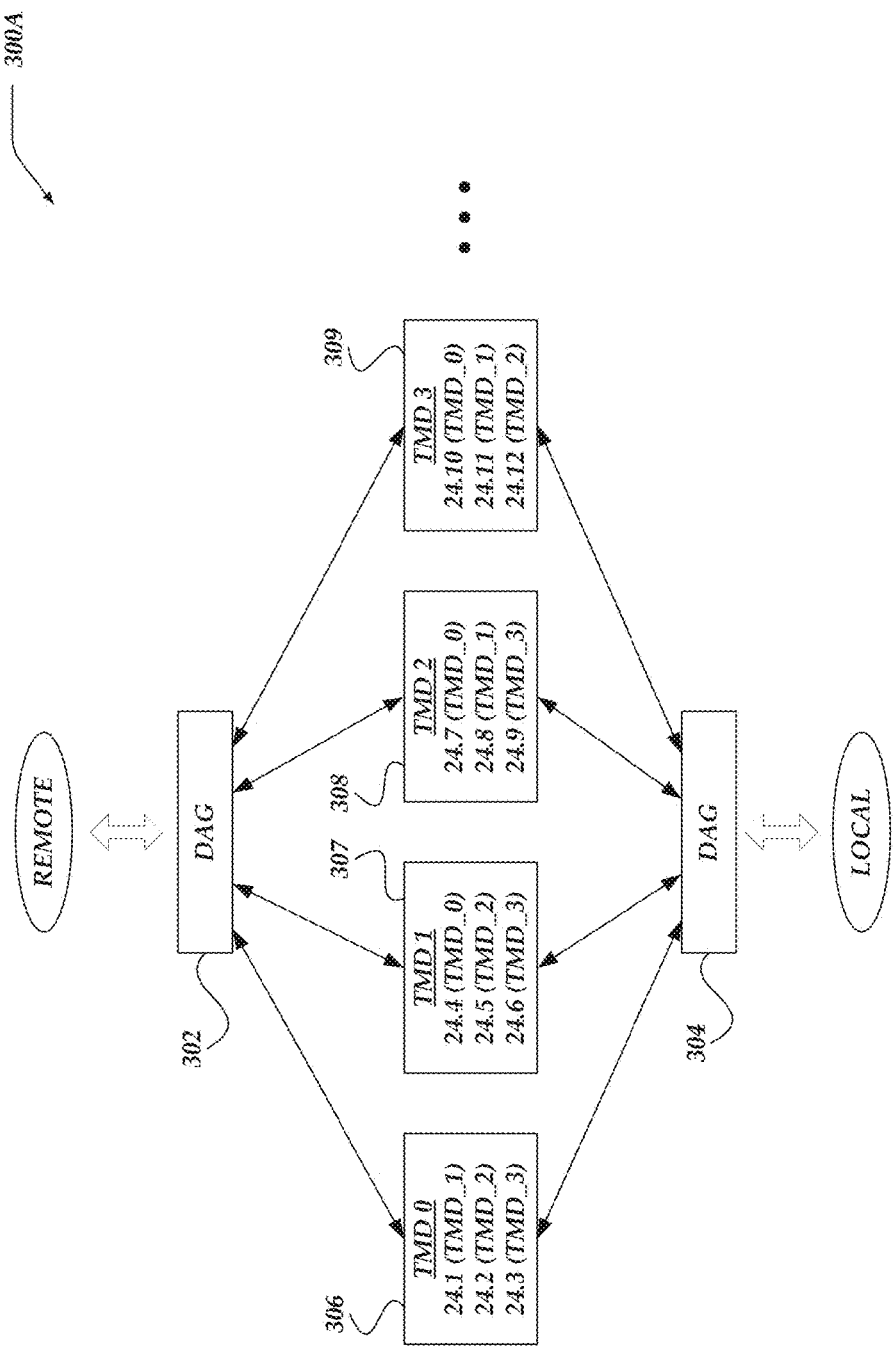
FIGS. 3A and 3B show example system diagrams of overprovisioning and redistributing IP addresses among a plurality of available traffic management devices.
Figure 3B:
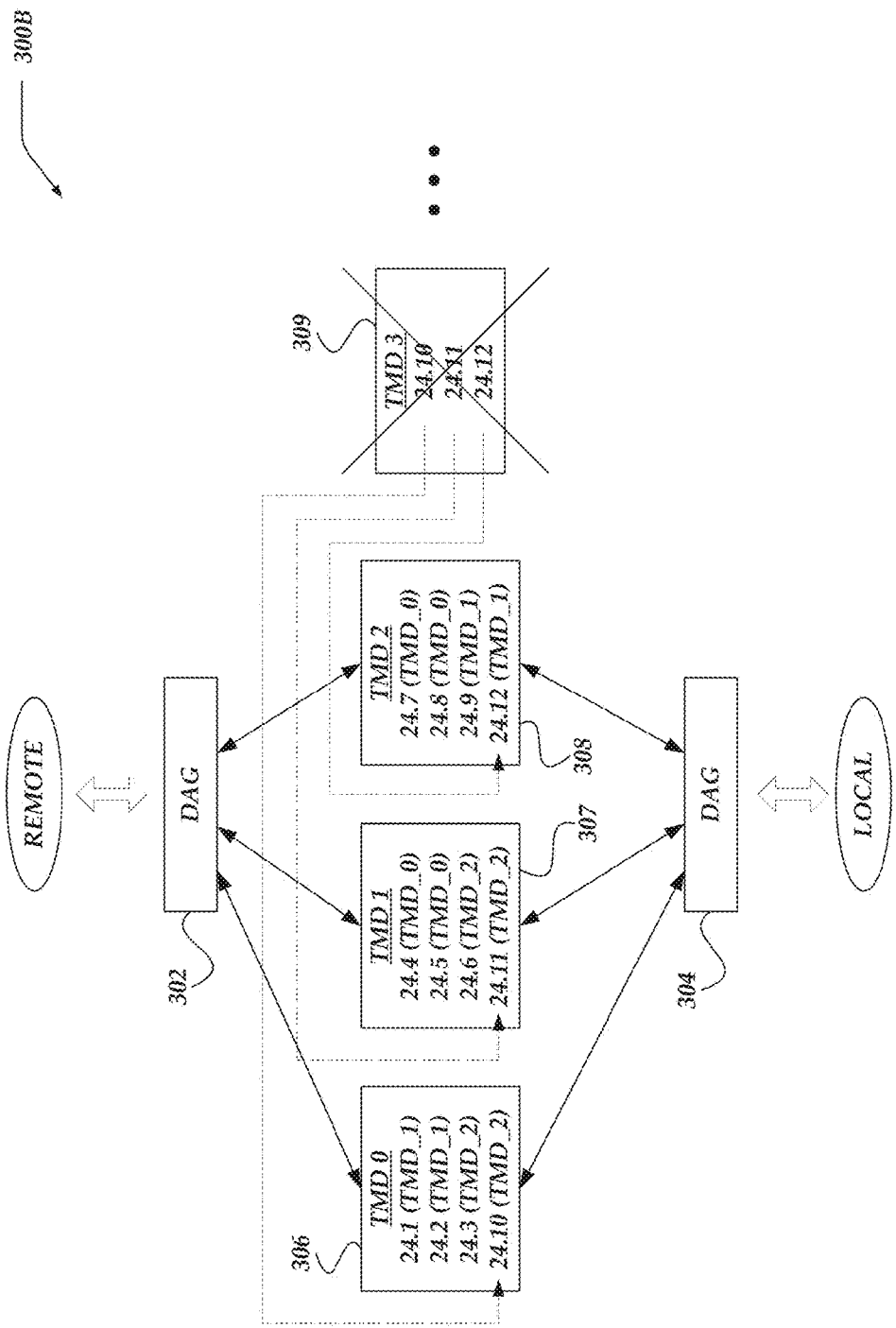

FIGS. 3A and 3B show example system diagrams of overprovisioning and redistributing IP addresses among a plurality of available traffic management devices. System 300A of FIG. 3A may be an embodiment of a packet traffic management device, such as PTMD 109 of FIG. 1.

System 300A may include DAG 302 and DAG 304. DAG 302 may manage traffic coming from remote devices, such as client computers 102-105 of FIG. 1. In various embodiments, DAG 302 may perform equal-cost multi-path routing (ECMP) to determine how to forward packets it receives from remote devices. DAG 304 may manage traffic coming from local devices, such as server computers 110-111 of FIG. 1. In various embodiments, DAG 304 may provide source network address translation (SNAT) to determine how to forward packets it receives from local devices, which is further illustrated in FIGS. 4A and 4B.

DAG 302 and DAG 304 may forward packets to TMDs 306-309 based on a destination IP address of the packets and the IP addresses associated with TMDs 306-309. In some embodiments, DAG 302 and/or DAG 304 may hand over a connection to a TMD such that the TMD may communicate with remote and/or local devices independent of the DAG.

TMDs 306-309 may include a plurality of TMDs. TMDs 306-309 may include one or more physical TMDs and/or one or more virtual TMDs. Each TMD may be associated with or be assigned a plurality of different IP addresses. So, distributing a total number of IP address among available TMDs may result in each available TMD being associated with a different subset of the total number of IP addresses. As illustrated, each TMD may be associated with three IP addresses (from a total of 12 IP addresses). For example, TMD 306 is associated with IP addresses 24.1; 24.2; and 24.3. It should be noted that the IP addresses show in the figure are for illustration purposes and the actual IP addresses utilized may vary. Also, it should be understood that the number of IP addresses employed may also be different than what is shown in the figure.

In various embodiments, each IP address may map to a media access control (MAC) address. And the MAC address may be assigned to the TMD for the corresponding IP address. Accordingly, when IP addresses are redistributed to available TMDs, such as when a TMD becomes unavailable, the MAC addresses that correspond to the redistributed IP addresses may be reassigned to the available TMDs.

The number of IP addresses to employ in system 300A may vary depending on user preferences, hardware constraints, or the like. For example, the hardware of a DAG and/or TMD may have constraints on the maximum number of IP addresses or connections it can handle. The DAG may include hardware that employs a hash table that maps IP addresses (or hashes of IP address) to TMDs. However, the size of this hash table may be limited by the hardware. So, the maximum number of IP addresses that the hardware can handle may be limited. It should be noted that software may be able to handle additional IP addresses, but at the cost of slower throughput compared to the hardware.

In various embodiments, the number of IP addresses to employ may be based on the maximum possible number of available TMDs, which may be the number of TMDs that a DAG can communicate with or is set up to communicate with—even if some of the TMDs are currently unavailable. In various embodiments, the number of IP addresses may be greater than the number of possibly available TMDs, which results in the overprovisioning of the IP addresses. Below are a few examples of the various mechanisms that may be employed to determine the number of IP addresses to utilize—where n is the maximum possible number of available TMDs.

Figure 5:
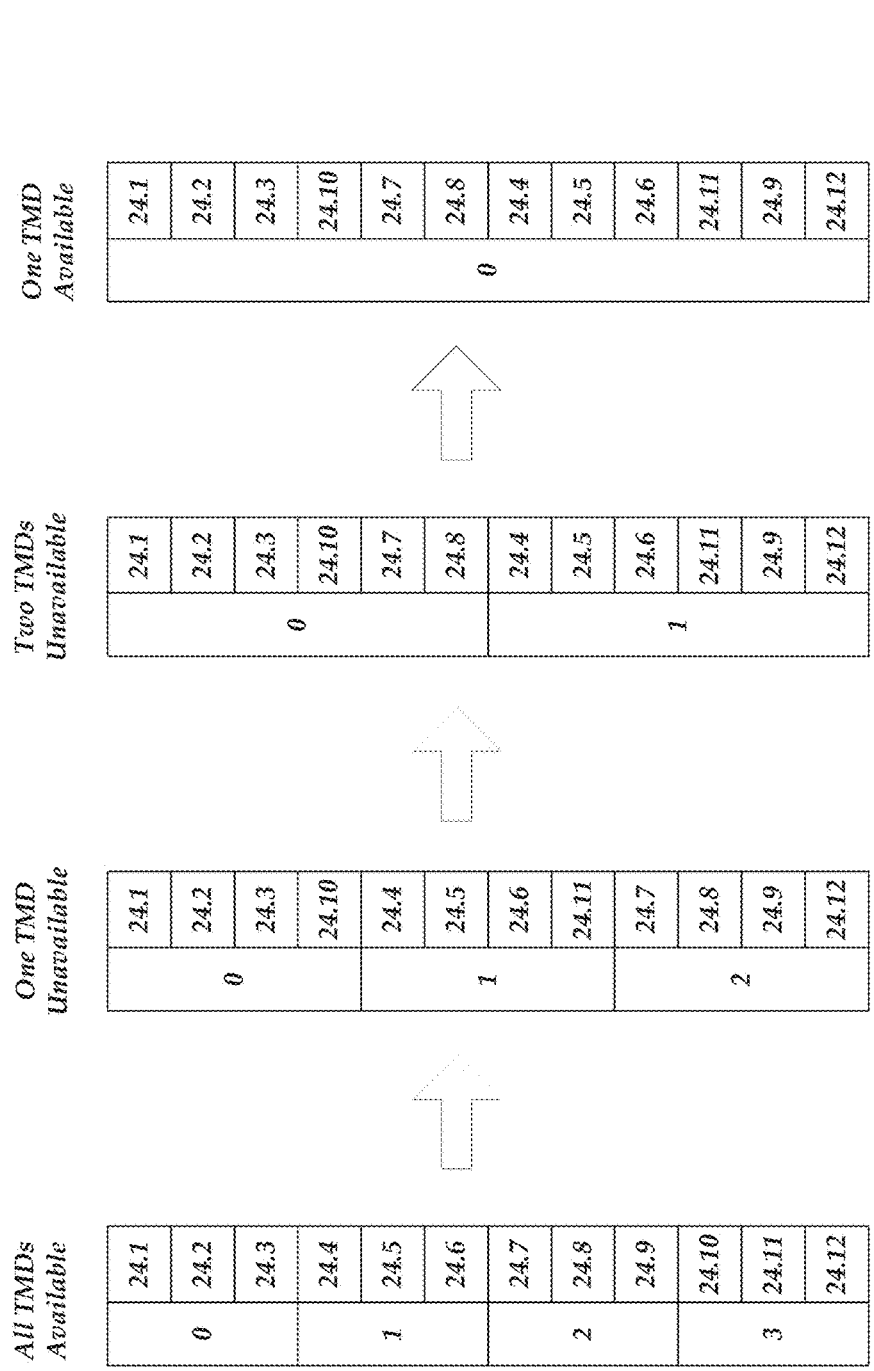
FIGS. 5 and 6 show alternative examples of redistribution of IP addresses as traffic management devices become unavailable.
Figure 6:
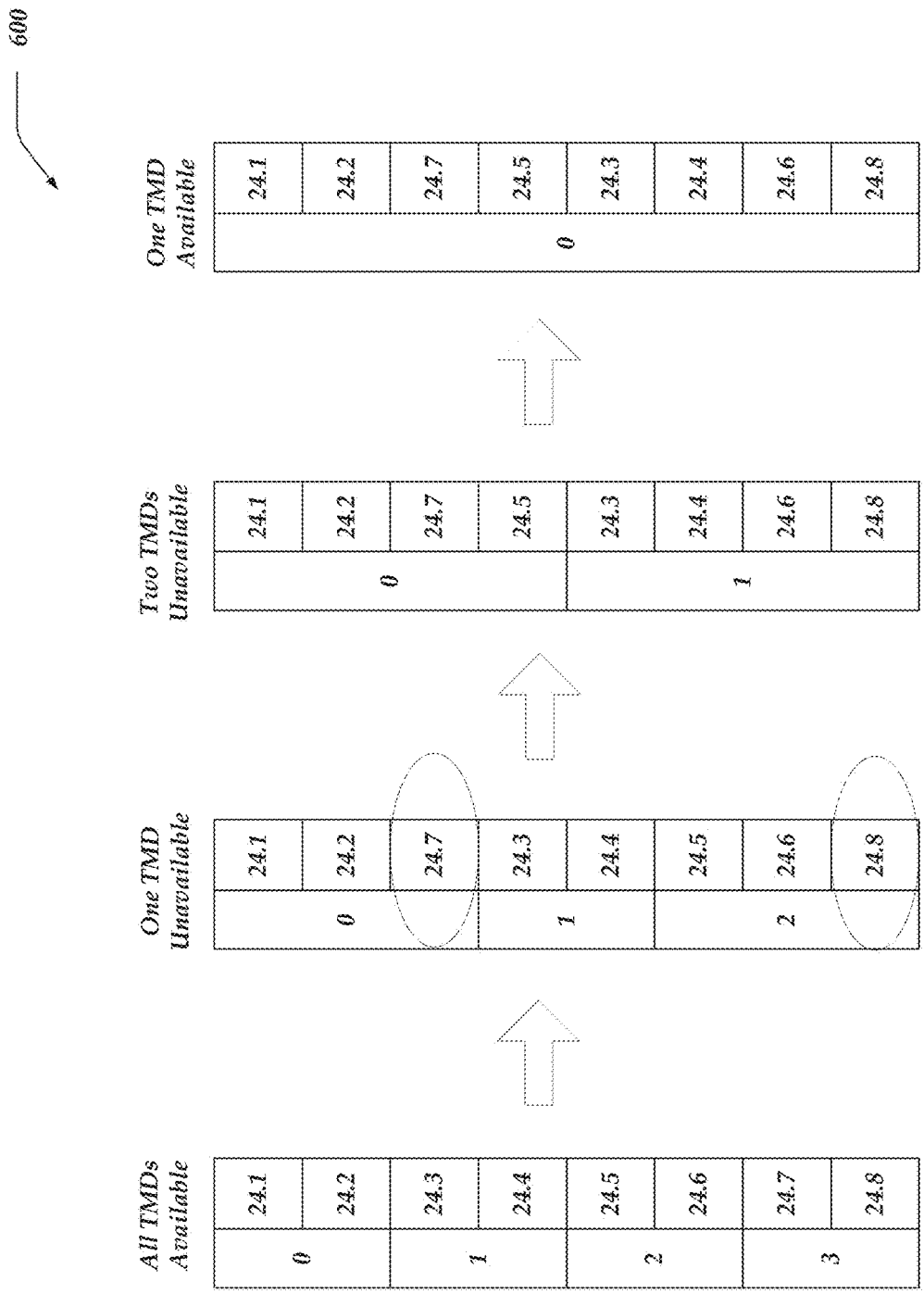

$n! \rightarrow$ n factorial
$LCM(1 \ldots n) \rightarrow$ least common multiple from one to n
$n^2$
$n(n-1) \rightarrow$ n times (n minus one)
n(next lowest prime number)$\rightarrow$n times the next lowest prime number below n
n(x), where x is some number$\rightarrow$n times some predetermined number such that the product results a number of IP addresses that produce a rounding error within a predetermined threshold
y, where y is some number$\rightarrow$some predetermined number of IP addresses greater than n The above list is ordered from the option with the smallest rounding error (n!) to the highest rounding error (y). An example illustrating no rounding error (e.g., by employing $LCM(1 \ldots n)$) is shown in FIG. 5. An example illustrating a rounding error (e.g., by employing n(x)) is shown in FIG. 6.

In various embodiments, each IP address may have one or more corresponding mirror TMDs. The mirror TMD may be an available TMD that is different than the TMD associated with the corresponding IP address. Connections and MAC addresses associated with an IP address may be mirrored on the corresponding mirror TMD. In some embodiments, this mirroring may include copying and/or storing connection states and/or information associated with an IP address from the TMD that is managing the connection (i.e., associated with the IP address) to the corresponding mirror TMD for the IP address. In the illustration of FIG. 3A, the parenthesis after the IP address indicates the corresponding mirror TMD for each separate IP address. If a TMD becomes unavailable, then the IP addresses from that TMD may be redistributed and/or reassigned to the corresponding mirror TMDs, which is illustrated in FIG. 3B. In this way, connections can seamlessly move from one TMD to another without interrupting the connection state.

Turning now to FIG. 3B. System 300B may be an embodiment of system 300A of FIG. 3A where one of TMDs 306-309 has become unavailable. In this illustration, TMD 309 may be unavailable. Employing embodiments described herein, the IP addresses associated with TMD 309 may be redistributed among the remaining available TMDs (TMDs 306-308). In some embodiments, the redistribution of IP addresses may be based on corresponding mirror TMDs for the IP addresses associated with the unavailable TMD.

In this illustration, IP address 24.10 may be assigned to TMD 306, IP address 24.11 may be assigned to TMD 307, and IP address 24.12 may be assigned to TMD 308. So, packets that arrive—after TMD 309 becomes unavailable—at DAG 302 or DAG 304 with one of these IP addresses may be forwarded to the newly assigned TMD. Once the IP addresses are redistributed to the remaining available TMDs, the corresponding mirror TMDs for each IP address may be re-determined. In some embodiments, only those IP addresses impacted by the unavailable TMD may have their corresponding mirror TMD re-determined. The impacted IP addresses may include those IP addresses that were previously associated with the unavailable TMD and have now been redistributed or those IP addresses whose corresponding mirror TMD is now the unavailable TMD. In this way, there may be less connection mirroring that needs to be done to account for the unavailable TMD. If another TMD becomes unavailable, then the IP addresses associated with the new unavailable TMD may be redistributed to the remaining available TMDs.

In various embodiments, the IP addresses from the unavailable TMD may be evenly distributed among available TMDs. In some embodiments, though, the IP addresses may not evenly distribute among available TMDs, resulting in a rounding error. Examples of a rounding error and embodiments for managing the unbalance of IP addresses associated with available TMDs is illustrated and described in more detail below in conjunction with FIG. 6.

In various embodiments, if a TMD becomes newly available, then at least one IP address from at least one other available TMD may be reassigned to be associated with the newly available TMD. For example, assume TMD 309 was unavailable and its IP addresses were redistributed to TMDs 306-308. If TMD 309 becomes available again, then IP addresses from TMDS 306-308 may be disassociated with those TMDs and associated with TMD 309. In some embodiments, the same IP addresses may be re-associated with a same TMD as before the TMD became unavailable (e.g., IP addresses 24.10, 24.11, and 24.12 may go back to TMD 309), but embodiments are not so limited. In other embodiments, other IP addresses from the available TMDs may be redistributed to the newly available TMD. For example, IP addresses 21.1, 24.5, and 24.12 may be associated with TMD 309 after it becomes available again. In yet other embodiments, a pool of unused IP addresses may be maintained, such that if a TMD becomes available then IP addresses from the pool may be used first before redistributing any of the IP addresses from the other available TMDs.

Due to the dynamic redistribution of IP addresses, the number TMDs in a cluster can be scaled to include more or fewer TMDs. In this way, TMDs can be added or removed from a cluster for a variety of reasons, such as, for example, removing a TMD to perform updates on the TMD, shutting down a TMD to conserve power during a low traffic time period, added a TMD to a cluster to account for additional traffic, adding a TMD to maintain current cluster size when other TMDs are removed for maintenance, or the like. As discussed above, embodiments may be generally described as TMDs being added or removed (i.e., becoming available or unavailable) for a variety of reasons.

Also, increases to the number of TMDs in a cluster may require an increased number of IP addresses and allocation of IP addresses to the TMDs. Decreases of the number of TMDs in a cluster, and resulting over provisioning of IP addresses, may drive the removal of assigned IP addresses. Mirroring mechanisms described herein can allow traffic to be forwarded to/from to-be-removed IP address to other IPs.

Figure 4A:
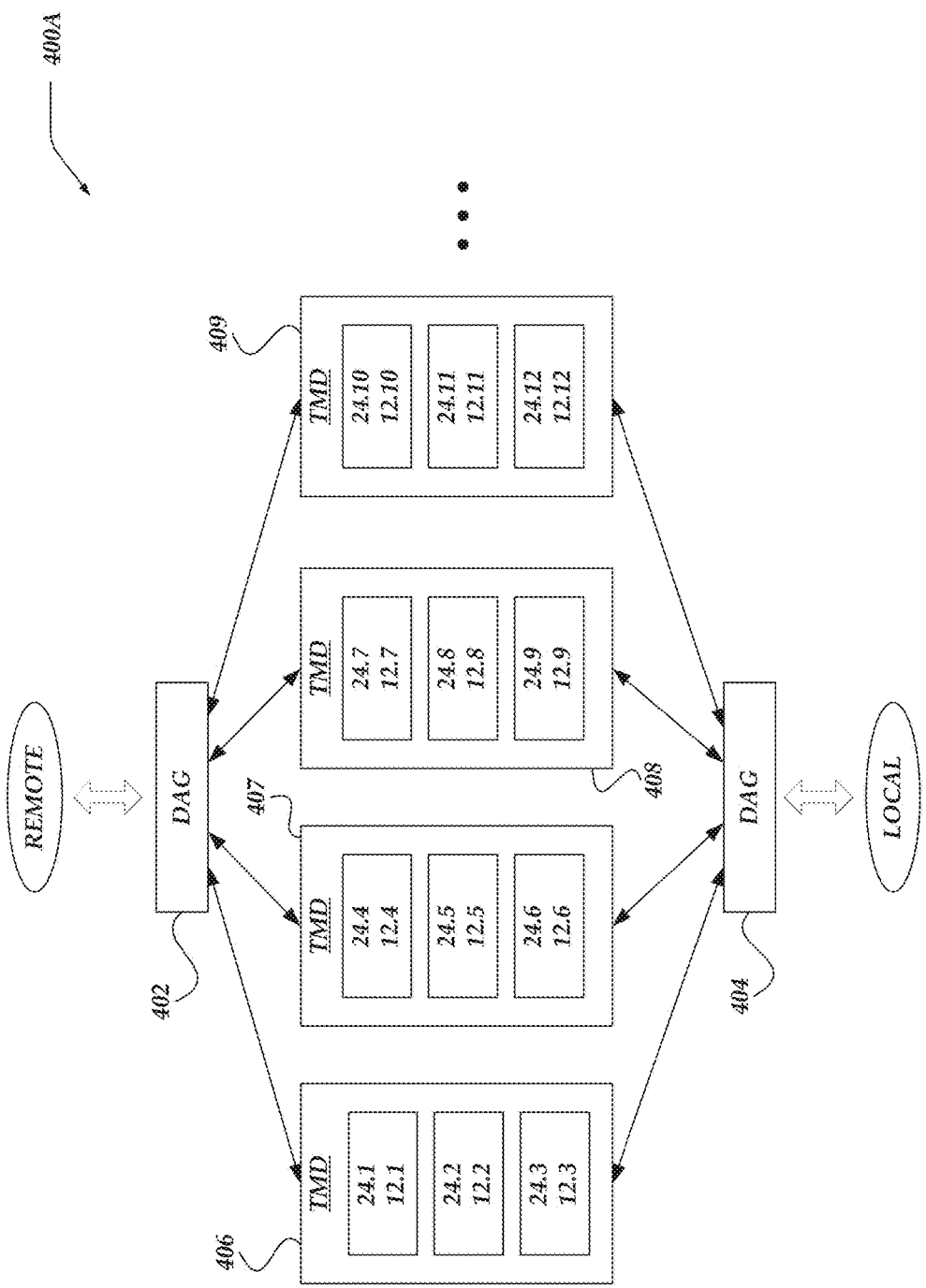
FIGS. 4A and 4B show alternative example system diagrams of overprovisioning and redistributing IP addresses among a plurality of available traffic management devices.
Figure 4B:
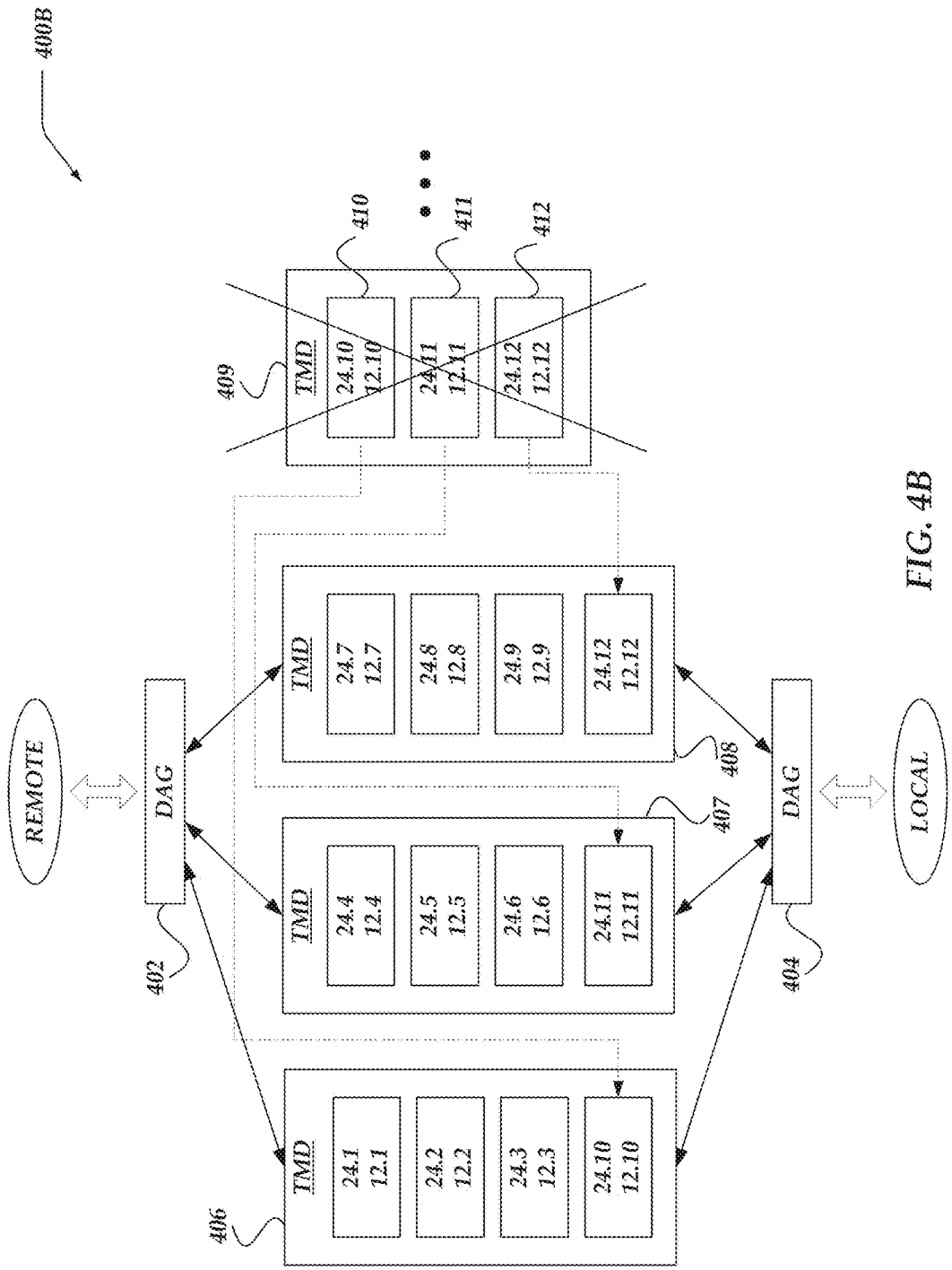

FIGS. 4A and 4B show alternative example system diagrams of overprovisioning and redistributing IP addresses among a plurality of available traffic management devices. Although embodiments described herein primarily refer to IP addresses being associated with TMDs and then redistributed when a TMD becomes unavailable, embodiments are not so limited. But rather, in some embodiments, each TMD may be associated with a plurality of traffic groups and the traffic groups may be redistributed when a TMD becomes unavailable. A traffic group may be a bundle of IP addresses, such as one IP address is for traffic coming from one DAG and another IP address is for traffic coming from another DAG. In this way, a traffic group includes IP addresses for connections in both directions between endpoints enabling reply traffic (e.g., SNAT traffic) to come back through the same TMD. It should be noted that the construct of a traffic group is a pair of IP addresses that make up a connection. Each IP address in a pair may be maintained together (such as a traffic group) or individually but being redistributed to a same TMD and having a same corresponding mirror TMD, such that the IP addresses in a pair are always together.

FIG. 4A shows an embodiment of system 400A, which may be an embodiment of system 300A of FIG. 3A. Similar to what is described above with reference to FIG. 3A, packets may flow from remote devices through DAG 402 and packets from local devices may flow through DAG 404. DAG 402 and DAG 404 may then forward packets to TMDs 406-409 based on the IP address associated with the packet and traffic group IP addresses for the TMDs.

Each TMD 406-409 may be associated with a plurality of traffic groups. As described above, the traffic group may include an IP addresses for packets in each direction between endpoints. For example, one traffic group for TMD 406 may include IP addresses 24.1 (for packets coming from remote device) and 12.1 (for packets coming from local devices), while another traffic group for TMD 406 may include IP addresses 24.2 and 12.2. Embodiments described herein for redistributing IP addresses may also be employed for traffic groups. So, if a TMD becomes unavailable, then the traffic groups may be redistributed among the available TMD, which is illustrated in FIG. 4B.

It should be noted that all IP addresses included in a traffic group may be redistributed to a same TMD such that the traffic group stays together on a same TMD. Also, instead of each IP address having a different corresponding mirror TMD, each traffic group may have a corresponding mirror TMD, which again will keep the IP addresses in a traffic group together on a same TMD. Keeping IP addresses in a traffic group together can enable bidirectional traffic between two endpoints to be handled by a same TMD. Thus, maintaining proper connection state information between the endpoints at a single TMD without the need to communicate state information between TMDs.

Turning now to FIG. 4B. System 400B may be an embodiment of system 400A of FIG. 4A where one of TMDs 406-409 has become unavailable. In this illustration, TMD 409 may be unavailable. Employing embodiments described herein, the traffic groups associated with TMD 409 may be redistributed among the remaining available TMDs (TMDs 406-408). In some embodiments, the redistribution of traffic groups may be based on corresponding mirror TMDs for the traffic groups associated with the unavailable TMD.

In this illustration, traffic groups 410-412 may be associated with TMD 409, which may now be unavailable. Traffic group 410 may be reassigned to TMD 406, traffic group 411 may be reassigned to TMD 407, and traffic group 412 may be reassigned to TMD 408. So, packets that arrive—after TMD 409 becomes unavailable—at DAG 302 or DAG 304 with one of IP addresses from one of these traffic groups may be forwarded to the newly assigned TMD. In some embodiments, the TMD that a traffic group is reassigned to may be based on the corresponding mirror TMD for that traffic group. As described herein, once the traffic groups are redistributed to the remaining available TMDs, the corresponding mirror TMDs for one or more traffic groups may be re-determined.

FIGS. 5 and 6 show alternative examples of redistribution of IP addresses as traffic management devices become unavailable. Example 500 of FIG. 5 shows four TMDs initially available with 12 IP addresses distributed among them. So, each TMD is associated with three different IP addresses. If one TMD fails, then the IP addresses may be redistributed among the remaining three available TMDs in accordance with embodiments described herein. As such, each available TMD is associated with four IP addresses. If another TMD were to fail, then the IP addresses for the unavailable TMD would then be assigned to the remaining two available TMDs. And so on.

As can be seen, each TMD has the same number of IP addresses as each other TMD, regardless of the number of available TMDs. This is possible because in this example, the least common multiple (LCM) from one to four (the number of TMDs) is 12, which will evenly distribute between the available TMDs. It should also be recognized that if a TMD becomes available, then the IP addresses may be redistributed, which would be similar to the reverse of a TMD becoming unavailable.

If there are limits on the number of IP addresses and the LCM(1 . . . n) is greater than the limit, then fewer IP addresses may be utilized. Example 600 of FIG. 6 shows the same four TMDs as FIG. 5, but with eight IP addresses distributed among them. So, each TMD is associated with two different IP addresses. If one TMD fails, then the IP addresses may be redistributed among the remaining three available TMDs in accordance with embodiments described herein. However, since there are two IP addresses associated with the failed TMD and there are three remaining TMDs available, one TMD will have two IP addresses and two TMDs will have three IP addresses. This unbalance of IP addresses among available TMD results in a rounding error.

Due to the unbalanced IP addresses, it is possible for the traffic going through the TMDs to also be unbalanced. As a result, additional load balancing of connections going to the TMDs with additional IP addresses may be performed. So, as packets are received with a destination IP address that maps to one of these IP-overloaded TMDs, then additional processing may be performed to more evenly distribute the connection load over all three TMDs. If a connection is to be moved to a different TMD, then the connection may be mirrored and moved to the different TMD and an additional mapping table may be maintained for this moved connection. As a result, the endpoints of the connection are again unaware of the unavailable TMD.

As described herein, the hardware may maintain a mapping table between IP addresses and TMD. However, if there is a rounding error, then software may be employed to maintain a separate mapping table for connections associated with IP addresses for an IP-overloaded TMD. It should be noted that embodiments are not so limited and hardware or software, or some other combination thereof may be employed to implemented embodiments described herein.

Assume the following example and the illustration in FIG. 6. A packet is received with a destination IP address of 24.3. Since this IP address is associated with a non-IP-overloaded TMD, then the hardware may process the packet and forward it to TMD_1. Next assume a packet is received with a destination IP address of 24.7 and a source IP address of 35.1. Since this destination IP address is associated with an IP-overloaded TMD, the software may load balance the connections and determine that TMD_1 has fewer connections. Accordingly, the separate mapping table may indicate that packets from source IP address 35.1 with a destination IP address of 24.7 will be mapped to TMD_1. Continuing this example, assume a packet is received with a destination IP address of 24.7 and a source IP address of 47.1. Since this destination IP address is again associated with an IP-overloaded TMD, the software may load balance the connections. This time, however, the connections may be balanced among TMDs, so the separate mapping table may indicate that packets from source IP address 47.1 with a destination IP address of 24.7 will be mapped to TMD_0.

Now assume that TMD_2 becomes unavailable. The IP addresses from TMD_2 may be redistributed among TMD_0 and TMD_1. Since the IP addresses are now evenly distributed between the two available TMDs, use of the separate mapping table may be halted or otherwise terminated and the hardware may be employed similar to all four TMDs being available. It should be noted that maintaining the separate mapping table may be beneficial in case TMD_2 later becomes available again.

The additional mapping table could be implemented by tracking individual streams of traffic or it could be implemented by via a second implementation of DAG via the mechanisms described herein. An example implementation might have the DAG be implemented in a switch via ECMP. The "mapping table" or second DAG might be implemented in software via larger tables in CPU and DRAM.

General Operation

The operation of certain aspects of the embodiments will now be described with respect to FIGS. 7-9. In at least one of various embodiments, processes 700, 800, or 900 of FIGS. 7-9, respectively, may be implemented by and/or executed on one or more computers, such as network computer 200 of FIG. 2 or other network device. Additionally, various embodiments described herein can be implemented in a system such as system 100 of FIG. 1.

Figure 7:
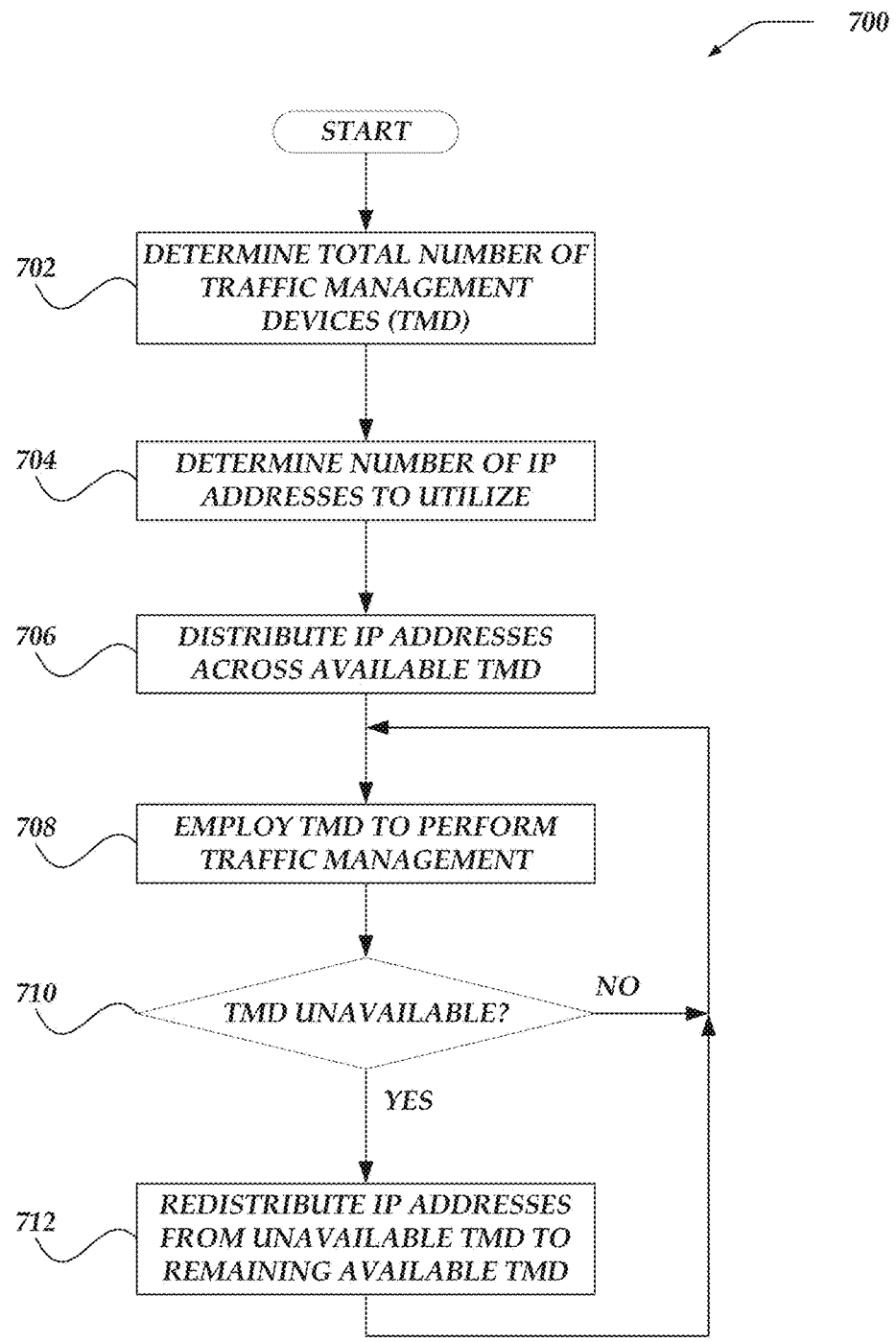
FIG. 7 illustrates a logical flow diagram generally showing one embodiment of an overview process for overprovisioning and redistributing IP addresses among a plurality of traffic management devices.

FIG. 7 illustrates a logical flow diagram generally showing one embodiment of an overview process for overprovisioning and redistributing IP addresses among a plurality of traffic management devices. Process 700 may begin, after a start block, at block 702, where a total number of TMDs may be determined. In various embodiments, the total number of TMDs may be the maximum number of possibly available TMDs. In at least one of various embodiments, the total number of TMDs may be a number of TMDs in a cluster of TMDs. In some embodiments, a system administrator or other user may predetermine or predefine the maximum number of TMDs that may be available.

Process 700 may proceed to block 704, where a number of IP addresses to utilize may be determined. As described above, the number of IP addresses may be determined based on hardware constraints of the TMDs, predetermined number of IP addresses, or the like. In at least one of various embodiments, the number of IP addresses may be related to the total number of TMDs determined at block 702, such as, for example, but not limited to, $n!$; $LCM(1 \ldots n)$; $n^2$; $n(n-1)$; n(next lowest prime number); n(x) resulting in a predetermined rounding error; or the like. In other embodiments, the total number IP addresses may be an arbitrary number, which may be more or less than the total number of TMDs.

In any event, process 700 may continue at block 706, where the IP addresses may be distributed across the available TMDs. The IP addresses may be evenly distributed among the available TMDs. If the number of IP address does not divide evenly into the number of available TMDs, then the IP addresses may be distributed with a rounding error where at least one TMD may have more IP addresses than at least one other TMD.

It should be understood that the number of available TMDs may be the same or less than the total number of possible TMDs determined at block 702. This result can occur if a total number of TMDs is provisioned, but only a subset of those TMDs are utilized. There are various reasons why the number of available TMDs may be less than the total number of possibly available TMDs, which may include, for example, because a TMD is powered down or in standby mode (e.g., because of low traffic levels), a TMD is performing an updating and is unavailable, a TMD is performing a backup and is unavailable, or the like.

Process 700 may proceed next to block 708, where each available TMD may be employed to perform its designated traffic management tasks. In various embodiments, routing protocols may be utilized to distribute traffic to the plurality of TMDs. Routing protocols could be used to redirect traffic toward the correct TMDs.

Process 700 may continue next at block 710, where a determination may be made whether a TMD has become unavailable. As described herein, a TMD may lose power, crash, initiate an update, perform a backup procedure, or the like, which may prohibit the TMD from performing its designated tasks, and thus making it unavailable. If a TMD is unavailable, then process 700 may flow to block 712; otherwise, process 700 may loop to block 708 where the TMDs continue to perform traffic management tasks.

At block 712, the IP addresses associated with the unavailable TMD may be redistributed among any remaining currently available TMDs. In some embodiments, the IP addresses may be evenly distributed among the available TMDs. If the number of IP addresses to be redistributed does not evenly distribute among available TMDs then they may be distributed such that at least one TMD has one more IP address than at least one other TMD, but so that the IP addresses remain as evenly distributed as possible.

After block 712, process 700 may loop to block 708, where the remaining available TMDs may continue to perform traffic management tasks.

In some embodiments, a previously unavailable TMD may become available. In at least one of various embodiments, at least one IP address may be removed from one or more available TMDs and associated with the newly available TMDs. In this way, the IP addresses are redistributed among the available TMDs, including the newly available TMD. In at least one embodiment, new IP addresses may be associated with the newly available TMD.

As described herein, IP addresses may be managed in connection pairs, e.g., traffic groups, such that traffic groups are redistributed upon a TMD becoming unavailable.

Figure 8:
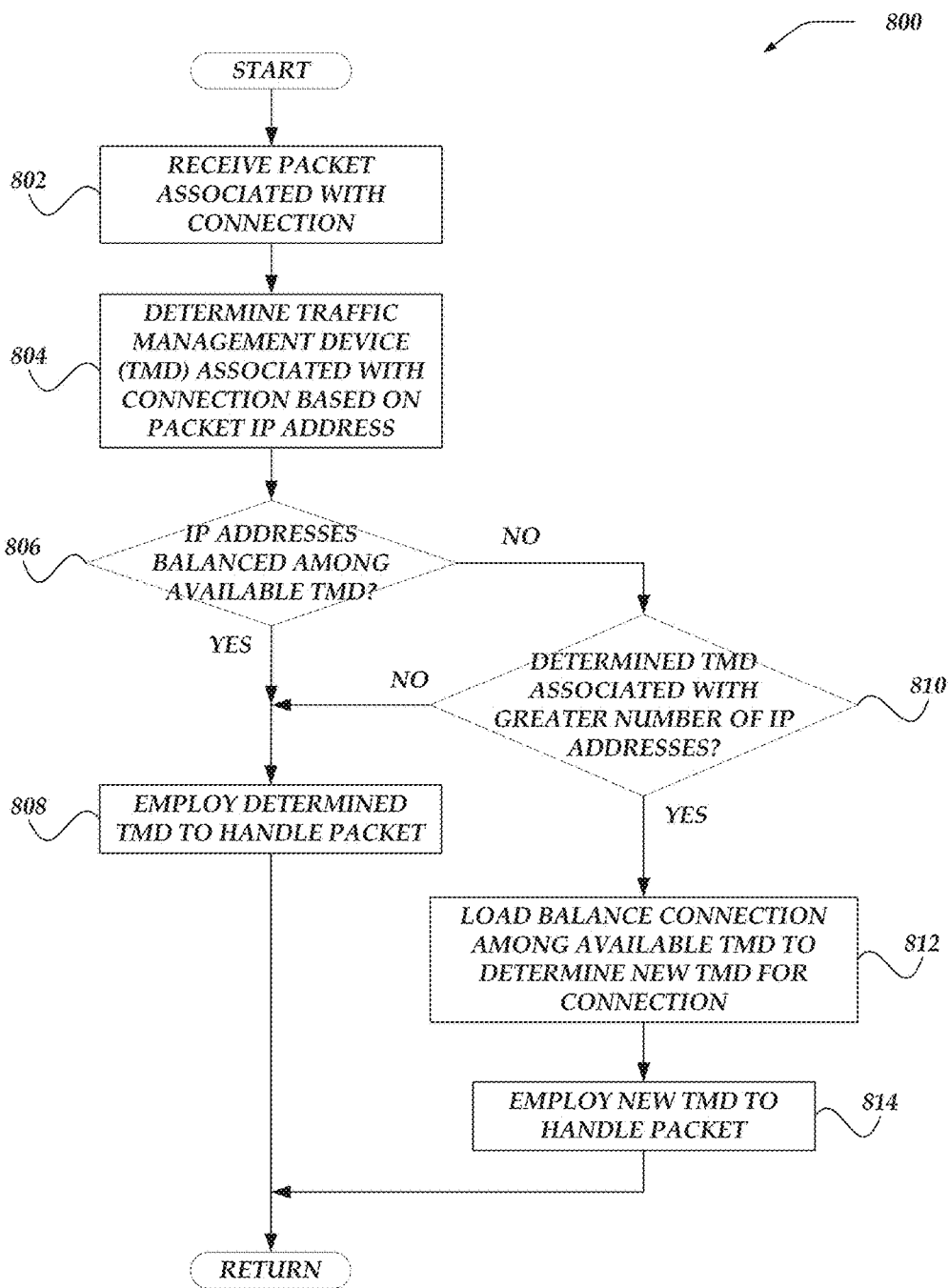
FIG. 8 illustrates a logical flow diagram generally showing one embodiment of a process for managing connections for overprovisioned IP addresses among a plurality of traffic management devices.

FIG. 8 illustrates a logical flow diagram generally showing one embodiment of a process for managing connections for overprovisioned IP addresses among a plurality of traffic management devices. Process 800 may begin, after a start block, at block 802, where a packet associated with a connection may be received. In various embodiments, the packet may be received at a DAG, such as DAG 302 or DAG 304 of FIG. 3.

Process 800 may proceed to block 804, where a TMD associated with the connection may be determined. In at least one of various embodiments, the TMD may be determined based on at least the destination IP address of the packet. In various embodiments, a hash or other algorithm may be employ along with a hash table or other data structure to calculate/determine the mapped TMD.

Process 800 may continue at decision block 806, where a determination may be made whether the IP addresses are balanced among the available TMDs. The IP addresses may be balanced if each TMD is associated with a same number of IP addresses as each other TMD. If at least one TMD has more or less IP addresses than another TMD, then the IP addresses are not balanced. If the IP addresses are balanced, then process 800 may flow to block 808; otherwise, process 800 may flow to decision block 810.

At block 808, the determined TMD may be employed to handle the packet. In various embodiments, the packet may be forwarded to the determined TMD for processing based on the tasks designated for the determined TMD. After block 808, process 800 may return to a calling process to perform other actions. In some embodiment, process 800 may loop to block 802 to continue to manage received packets.

If, at decision block 806, the IP addresses are not balanced among the available TMDs, then process 800 may flow from decision block 806 to decision block 810. At block 810, a determination may be made whether the determined TMD is associated with a greater number of IP addresses than another TMD. In at least one of various embodiments, the determination may be made by comparing the number of IP addresses associated with each separate TMD. If the determined TMD is associated with a greater number of IP addresses, then process 800 may flow to block 812; otherwise, process 800 may flow to block 808, where the determined TMD may be employed to handle the packet.

In some embodiments, resource contention may be employed to determine if and how IP addresses may be distributed among available TMDs. For example, if a TMD has run out of CPU/Memory/Crypto capacity, then on or more IP addresses may be load balanced (e.g., at block 812) to one or more other TMDs.

At block 812, the connection associated with the packet may be load balanced among the available TMDs. Since the determined TMD has more IP addresses than at least one other TMD, the determined TMD may receive more traffic than the other TMDs, which can reduce the efficiency of all available TMDs. In at least one of various embodiments, the connection may be assigned to a new available TMD. By determining a new TMD to handle the connection, the traffic can be further balanced among TMDs even through the IP addresses are unbalanced across the TMDs. In some embodiments, a separate mapping table may be employed to manage these moved connections.

Processes 800 may proceed next to block 814, where the new TMD may be employed to handle the packet. In at least one of various embodiments, block 814 may employ embodiments of block 808 but with the new TMD rather than the initially determined TMD. After block 814, process 800 may return to a calling process to perform other actions. In some embodiment, process 800 may loop to block 802 to continue to manage received packets.

Figure 9:
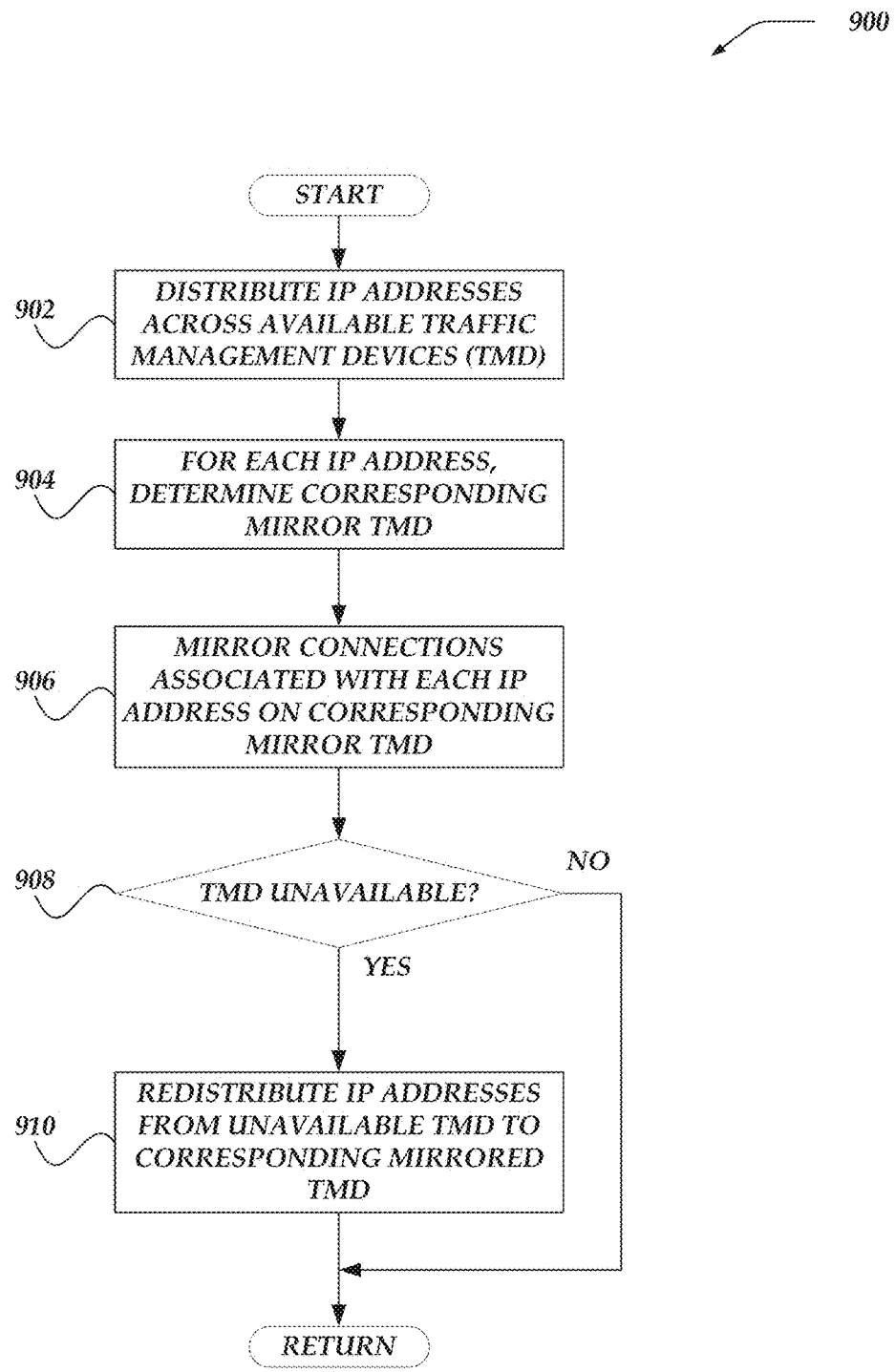
FIG. 9 illustrates a logical flow diagram generally showing one embodiment of a process for mirroring traffic management devices based on overprovisioning of IP addresses among a plurality of traffic management devices.

FIG. 9 illustrates a logical flow diagram generally showing one embodiment of a process for mirroring traffic management devices based on overprovisioning of IP addresses among a plurality of traffic management devices. Process 900 may begin, after a start block, at block 902, where IP address may be distributed across the available TMDs. In at least one of various embodiments, block 902 may employ embodiments of process 700 to distribute the IP address across available TMDs.

Process 900 may proceed to block 904, where a corresponding mirror TMD may be determined for each IP address. A corresponding mirror TMD may be another available TMD that an IP address is not currently associated with, but will be assigned to upon its current TMD becoming unavailable. In at least one embodiment, each IP address may have one or more corresponding mirror TMDs.

For example, FIGS. 3A and 3B illustrate four TMDs. As shown in FIG. 3A, each IP address includes a corresponding mirror TMD (i.e., in parenthesis after the illustrative IP addresses) that is different than the current TMD that it is assigned to. Each corresponding mirror TMD tells the system where each IP address will be redistributed to upon that TMD becoming unavailable.

Every time a TMD becomes unavailable and its IP addresses are redistributed to the remaining available TMDs, new corresponding mirror TMDs may be determined for each IP address. This redetermination of corresponding mirror TMDs can be seen in FIG. 3B. Notice that the corresponding mirror TMDs have changed from FIG. 3A so that the unavailable TMD is no longer a corresponding mirror TMD. Similarly, if a TMD becomes available and IP addresses are redistributed, new corresponding mirror TMDs may be determined for each IP address. In this way, the IP addresses, connection mirrors, and connections may be balanced among the currently available TMDs and can dynamically adjust as TMDs become available or unavailable.

In various embodiments, the mirror TMDs may be determined based on load balancing algorithms and the current traffic/connections for each IP address and/or each TMD. In some embodiments, a list of each IP address and a corresponding mirror TMD may be maintained.

In any event, process 900 may proceed to block 906, where the connections associated with each IP address may be mirrored on its corresponding mirror TMD. In at least one of various embodiments, mirroring a connection may include copying and/or storing a state of the connection on the corresponding mirror TMD, even though the mirror TMD does not currently manage packets associated with that IP address. This mirroring can provide for efficient transfer of connections from one TMD to one or more other TMDs upon a TMD becoming unavailable.

Process 900 may continue at decision block 908, where a determination may be made whether a TMD is unavailable. In at least one of various embodiments, decision block 908 may employ embodiments of decision block 710 to determine if a TMD is unavailable. If a TMD is unavailable, process 900 may flow to block 910; otherwise, process 900 may return to a calling process to perform other actions.

At block 910, the IP address associated with the unavailable TMD may be redistributed to the corresponding mirrored TMDs. So, when a TMD becomes unavailable, the IP addresses from that TMD are moved to the mirror TMDs that correspond to the IP addresses. And since the mirror TMDs already include all connection state information for connections associated with its newly associated IP address, those connections may continue without having to reestablish the connection. Without the need to reestablish connections, the endpoints of a connection may be unaware of a TMD becoming unavailable.

After block 910, process 900 may return to a calling process to perform other actions. In some embodiments, connections may continue to be mirrored as connections are established and/or terminated. And as TMDs are made available or become unavailable, the corresponding mirror TMDs may be re-determined once the IP addresses are redistributed among the available TMDs.

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

The above specification, examples, and data provide a complete description of the manufacture and use of various embodiments, and are claimed hereinafter.

What is claimed is:

1. A method for managing packet traffic in a network, comprising:
   over-provisioning a plurality of Internet Protocol (IP) addresses distributed to available traffic management devices (TMDs) in a plurality of TMDs, wherein an amount of the plurality of IP addresses is greater than an amount of the plurality of TMDs;
   employing the available TMDs to perform traffic management on received packets based on at least a destination IP address of the received packets and each of the plurality of IP addresses previously distributed to the available TMDs, and wherein each connection for an available TMD is mirrored on another available TMD;
   employing an unavailability of a previously available TMD to redistribute each connection on the previously available TMD to the mirrored connections on the other available TMD, wherein the redistributed connections include the plurality of IP addresses previously distributed to the unavailable TMD, wherein each IP address has a corresponding connection and a media access control (MAC) address that is assigned to the previously available TMD, and wherein the MAC address is reassigned to the other available TMD when the previously available TMD is currently unavailable; and
   when an imbalance in a load on one or more of the available TMDs is detected due to the redistributed connections, employing a separate mapping table of each connection associated with each IP address that corresponds to each MAC address that is assigned to an available TMD to rebalance the load on the one or more available TMDs by distributing one or more connections among the available TMDs, wherein the rebalancing of the loads is prioritized over balancing a number of IP addresses distributed to the available TMDs.

2. The method of claim 1, wherein the amount of the plurality of IP addresses is a common multiple from 1 to a number based on the amount of the plurality of TMDs.

3. The method of claim 1, wherein the amount of the plurality of IP addresses is determined based on a rounding error within a predetermined threshold.

4. The method of claim 1, further comprising:
   determining available TMDs as mirrors for other available TMDs that have one or more distributed IP addresses; and
   for each mirror TMD, mirroring connections associated with each distributed IP address and each corresponding other TMD.

5. The method of claim 1, further comprising, when more IP addresses are distributed to an available TMD than other available TMDs, load balancing connections corresponding to the more IP addresses to at least one other available TMD.

6. The method of claim 1, wherein the distribution of the plurality of IP addresses includes the distribution of a plurality of traffic groups that each include a pair of IP addresses, such that when a previously available TMD is currently unavailable, the plurality of traffic groups previously distributed to the unavailable TMD is redistributed to one or more currently available TMDs.

7. The method of claim 1, further comprising:
   increasing the amount of the plurality of IP addresses when the amount of the plurality of TMDs increases; and
   decreasing the amount of the plurality of IP addresses when the amount of the plurality of TMDs decreases.

8. The method of claim 1, further comprising:
   employing a Disaggregator (DAG) and the mapping table to manage the plurality of IP address and their distribution, along with traffic flowing through the plurality of TMDs.

9. The method of claim 1, further comprising distributing frames to the plurality of IP addresses based on Equal Cost Multi-Path Routing (ECMP) protocol.

10. The method of claim 1, further comprising employing the plurality of IP addresses for a next hop route using Equal Cost Multi-Path Routing (ECMP) protocol based routing, wherein each of the plurality of IP addresses is used as a next hop IP address.

11. A apparatus for managing packet traffic in a network, comprising:
   a memory for storing instructions; and
   a processor that executes the instructions to perform functions, including:

distributing a plurality of Internet Protocol (IP) addresses to available traffic management devices (TMDs) in a plurality of TMDs, wherein an amount of the plurality of IP addresses is greater than an amount of the plurality of TMDs;

employing the available TMDs to perform traffic management on received packets based on at least a destination IP address if the received packets and each of the plurality of IP addresses previously distributed to the available TMDs, and wherein each connection for an available TMD is mirrored on another available TMD;

employing an unavailability of a previously available TMD to redistribute each connection on the previously available TMD to the mirrored connections on the other available TMD, wherein the redistributed connections include the plurality of IP addresses previously distributed to the unavailable TMD, wherein each IP address has a corresponding connection and a media access control (MAC) address that is assigned to the previously available TMD, and wherein the MAC address is reassigned to the other available TMD when the previously available TMD is currently unavailable; and when an imbalance in a load on one or more of the available TMDs is detected due to the redistributed connections, employing a separate mapping table of each connection associated with each IP address that corresponds to each MAC address that is assigned to an available TMD to rebalance the load on the one or more available TMDs by distributing one or more connections among the available TMDs, wherein the rebalancing of the loads is prioritized over balancing a number of IP addresses distributed to the available TMDs.

12. The apparatus of claim 11, wherein the amount of the plurality of IP addresses is a common multiple from 1 to a number based on the amount of the plurality of TMDs.

13. The apparatus of claim 11, wherein the amount of the plurality of IP addresses is determined based on a rounding error within a predetermined threshold.

14. The apparatus of claim 11, wherein the processor executes the instructions to perform further actions, comprising:
determining available TMDs as mirrors for other available TMDs that have one or more distributed IP addresses; and
for each mirror TMD, mirroring connections associated with each distributed IP address and each corresponding other TMD.

15. The apparatus of claim 11, wherein the processor executes the instructions to perform further actions, comprising, when more IP addresses are distributed to an available TMD than other available TMDs, load balancing connections corresponding to the more IP addresses to at least one other available TMD.

16. The apparatus of claim 11, wherein the distribution of the plurality of IP addresses includes the distribution of a plurality of traffic groups that each include a pair of IP addresses, such that when a previously available TMD is currently unavailable, the plurality of traffic groups previously distributed to the unavailable TMD is redistributed to one or more currently available TMDs.

17. The apparatus of claim 11, wherein the processor executes the instructions to perform further actions, comprising:

increasing the amount of the plurality of IP addresses when the amount of the plurality of TMDs increases; and
decreasing the amount of the plurality of IP addresses when the amount of the plurality of TMDs decreases.

18. The apparatus of claim 11, wherein the processor executes the instructions to perform further actions, comprising:
employing a Disaggregator (DAG) and mapping table to manage the plurality of IP address and their distribution, along with traffic flowing through the plurality of TMDs.

19. The apparatus of claim 11, wherein the processor executes the instructions to perform further actions comprising distributing frames to the plurality of IP addresses based on Equal Cost Multi-Path Routing (ECMP) protocol.

20. The apparatus of claim 11, wherein the processor executes the instructions to perform further actions comprising employing the plurality of IP addresses for a next hop route using Equal Cost Multi-Path Routing (ECMP) protocol based routing, wherein each of the plurality of IP addresses is used as a next hop IP address.

21. A computer-readable non-transitory storage media that includes instructions for managing packet traffic in a network, wherein the execution of the instructions by a processor enables actions, comprising:

distributing a plurality of Internet Protocol (IP) addresses to available traffic management devices (TMDs) in a plurality of TMDs, wherein an amount of the plurality of IP addresses is greater than an amount of the plurality of TMDs;

employing the available TMDs to perform traffic management on received packets based on at least a destination IP address of the received packets and each of the plurality of IP addresses previously distributed to the available TMDs, and wherein each connection for an available TMD is mirrored on another available TMD;

employing an unavailability of a previously available TMD to redistribute each connection on the previously available TMD to the mirrored connections on the other available TMD, wherein the redistributed connections include the plurality of IP addresses previously distributed to the unavailable TMD, wherein each IP address has a corresponding connection and a media access control (MAC) address that is assigned to the previously available TMD, and wherein the MAC address is reassigned to the other available TMD when the previously available TMD is currently unavailable; and when an imbalance in a load on one or more of the available TMDs is detected due to the redistributed connections, employing a separate mapping table of each connection associated with each IP address that corresponds to each MAC address that is assigned to an available TMD to rebalance the load on the one or more available TMDs by distributing one or more connections among the available TMDs, wherein the rebalancing of the loads is prioritized over balancing a number of IP addresses distributed to the available TMDs.

22. The computer-readable non-transitory storage media of claim 21, wherein the amount of the plurality of IP addresses is a common multiple from 1 to a number based on the amount of the plurality of TMDs.

23. The computer-readable non-transitory storage media of claim 21, wherein the amount of the plurality of IP addresses is determined based on a rounding error within a predetermined threshold.

24. The computer-readable non-transitory storage media of claim 21, further comprising:
   determining available TMDs as mirrors for other available TMDs that have one or more distributed IP addresses; and
   for each mirror TMD, mirroring connections associated with each distributed IP address and each corresponding other TMD.

25. The computer-readable non-transitory storage media of claim 21, further comprising, when more IP addresses are distributed to an available TMD than other available TMDs, load balancing connections corresponding to the more IP addresses to at least one other available TMD.

26. The computer-readable non-transitory storage media of claim 21, wherein the distribution of the plurality of IP addresses includes the distribution of a plurality of traffic groups that each include a pair of IP addresses, such that when a previously available TMD is currently unavailable, the plurality of traffic groups previously distributed to the unavailable TMD is redistributed to one or more currently available TMDs.

27. The computer-readable non-transitory storage media of claim 21, further comprising:
   increasing the amount of the plurality of IP addresses when the amount of the plurality of TMDs increases; and
   decreasing the amount of the plurality of IP addresses when the amount of the plurality of TMDs decreases.

28. The computer-readable non-transitory storage media of claim 21, further comprising:
   employing a Disaggregator (DAG) and mapping table to manage the plurality of IP address and their distribution, along with traffic flowing through the plurality of TMDs.

29. The computer-readable non-transitory storage media of claim 21, further comprising distributing frames to the plurality of IP addresses based on Equal Cost Multi-Path Routing (ECMP) protocol.

30. The computer-readable non-transitory storage media of claim 21, further comprising employing the plurality of IP addresses for a next hop route using Equal Cost Multi-Path Routing (ECMP) protocol based routing, wherein each of the plurality of IP addresses is used as a next hop IP address.

31. A system for managing packet traffic in a network, comprising:
   at least one network device that includes:
      a memory for storing instructions;
      a processor that executes the instructions to enable actions, comprising:
         distributing a plurality of Internet Protocol (IP) addresses to available traffic management devices (TMDs) in a plurality of TMDs, wherein an amount of the plurality of IP addresses is greater than an amount of the plurality of TMDs;
         employing the available TMDs to perform traffic management on received packets based on at least a destination IP address of the received packets and each of the plurality of IP addresses previously distributed to the available TMDs, and wherein each connection for an available TMD is mirrored on another available TMD;
         employing an unavailability of a previously available TMD to redistribute each connection on the previously available TMD to the mirrored connections on the other available TMD, wherein the redistributed connections include the plurality of IP addresses previously distributed to the unavailable TMD, wherein each IP address has a corresponding connection and a media access control (MAC) address that is assigned to the previously available TMD, and wherein the MAC address is reassigned to the other available TMD when the previously available TMD is currently unavailable; and
         when an imbalance in a load on one or more of the available TMDs is detected due to the redistributed connections, employing a separate mapping table of each connection associated with each IP address that corresponds to each MAC address that is assigned to an available TMD to rebalance the load on the one or more available TMDs by distributing one or more connections among the available TMDs, wherein the rebalancing of the loads is prioritized over balancing a number of IP addresses distributed to the available TMDs.

32. The system of claim 31, wherein the amount of the plurality of IP addresses is a common multiple from 1 to a number based on the amount of the plurality of TMDs.

33. The system of claim 31, wherein the amount of the plurality of IP addresses is determined based on a rounding error within a predetermined threshold.

34. The system of claim 31, wherein the processor executes the instructions to perform further actions, comprising:
   determining available TMDs as mirrors for other available TMDs that have one or more distributed IP addresses; and
   for each mirror TMD, mirroring connections associated with each distributed IP address and each corresponding other TMD.

35. The system of claim 31, wherein the processor executes the instructions to perform further actions, comprising, when more IP addresses are distributed to an available TMD than other available TMDs, load balancing connections corresponding to the more IP addresses to at least one other available TMD.

36. The system of claim 31, wherein the distribution of the plurality of IP addresses includes the distribution of a plurality of traffic groups that each include a pair of IP addresses, such that when a previously available TMD is currently unavailable, the plurality of traffic groups previously distributed to the unavailable TMD is redistributed to one or more currently available TMDs.

37. The system of claim 31, wherein the processor executes the instructions to perform further actions, comprising:
   increasing the amount of the plurality of IP addresses when the amount of the plurality of TMDs increases; and
   decreasing the amount of the plurality of IP addresses when the amount of the plurality of TMDs decreases.

38. The system of claim 31, wherein the processor executes the instructions to perform further actions, comprising:
   employing a Disaggregator (DAG) and mapping table to manage the plurality of IP address and their distribution, along with traffic flowing through the plurality of TMDs.

39. The system of claim 31, further comprising distributing frames to the plurality of IP addresses based on Equal Cost Multi-Path Routing (ECMP) protocol.

40. The system of claim 31, further comprising employing the plurality of IP addresses for a next hop route using Equal Cost Multi-Path Routing (ECMP) protocol based routing, wherein each of the plurality of IP addresses is used as a next hop IP address.

* * * * *